United States Patent
Szczepanik et al.

(10) Patent No.: US 11,606,135 B2
(45) Date of Patent: Mar. 14, 2023

(54) BEAM ALIGNMENT FOR ELECTRONICALLY STEERED ANTENNAE SYSTEMS

(71) Applicant: HANWHA PHASOR LTD., London (GB)

(72) Inventors: John-Paul Szczepanik, Ledbury (GB); Philip Schryber, Ledbury (GB); Richard Hammond Mayo, Ledbury (GB)

(73) Assignee: HANWHA PHASOR LTD., London (GB)

( * ) Notice: Subject to any disclaimer, the term of this patent is extended or adjusted under 35 U.S.C. 154(b) by 0 days.

(21) Appl. No.: 17/053,611

(22) PCT Filed: May 3, 2019

(86) PCT No.: PCT/GB2019/051238
§ 371 (c)(1),
(2) Date: Nov. 6, 2020

(87) PCT Pub. No.: WO2019/215430
PCT Pub. Date: Nov. 14, 2019

(65) Prior Publication Data
US 2021/0194568 A1   Jun. 24, 2021

(30) Foreign Application Priority Data

May 9, 2018   (GB) ..................... 1807538

(51) Int. Cl.
*H04B 7/08*   (2006.01)
*H01Q 3/34*   (2006.01)

(52) U.S. Cl.
CPC .............. *H04B 7/0897* (2013.01); *H01Q 3/34* (2013.01)

(58) Field of Classification Search
CPC .............. H04B 7/0897; H04B 1/70735; H04B 7/0617; H04B 7/0828; H04B 7/0854;
(Continued)

(56) References Cited

U.S. PATENT DOCUMENTS

| | | |
|---|---|---|
| 4,445,118 A | 4/1984 | Taylor et al. |
| 5,313,215 A | 5/1994 | Walker et al. |

(Continued)

FOREIGN PATENT DOCUMENTS

| | | |
|---|---|---|
| EP | 3297375 A1 | 3/2018 |
| WO | 2010007442 A1 | 1/2010 |

OTHER PUBLICATIONS

International Search Report and Written Opinion, PCT/GB2019/051238, dated Aug. 30, 2019, 9 pages.

(Continued)

*Primary Examiner* — Kenneth T Lam
(74) *Attorney, Agent, or Firm* — Potomac Law Group, PLLC; Reza Mollaaghababa; Reza Sadr (57) ABSTRACT

A method of auto-aligning a beam within a receiving electronically steered antenna system comprising a plurality of antenna elements is provided. The method comprises the steps of: providing a list of codes, wherein each code is embedded in signals transmitted by a respective transmitting entity, and identifies the transmitted signal as originating from said transmitting entity; selecting a transmitter and identifying a corresponding code for that transmitter; and for each antenna element: receiving a first communications signal; receiving a second signal representative of first communications signals received by each of the plurality of antenna elements; correlating the first and second signals with the identified code to generate first and second output signals; comparing the first and second output signals and determining a phase shift and/or time delay for minimizing (Continued)

the difference between the first and second output signals; and applying the phase shift and/or time delay to the first received communication signal.

17 Claims, 6 Drawing Sheets

(58) Field of Classification Search
CPC .. H04B 7/0857; H04B 7/0862; H04B 7/0865; H04B 7/088; H04L 7/042; G01S 19/21; G01S 19/256; G01S 19/30; H01Q 3/34; H01Q 3/2617; H04W 16/28
See application file for complete search history.

(56) References Cited

U.S. PATENT DOCUMENTS

| | | | |
|---|---|---|---|
| 6,337,658 B1 | 1/2002 | Tong et al. | |
| 10,270,488 B2* | 4/2019 | Marr | H04B 1/0475 |
| 2002/0004369 A1 | 1/2002 | Kelly et al. | |
| 2004/0187162 A1 | 9/2004 | Wu et al. | |
| 2008/0158078 A1 | 7/2008 | Allen et al. | |
| 2010/0128661 A1* | 5/2010 | Becker | H04L 1/0003 370/316 |
| 2010/0222005 A1* | 9/2010 | Jacomb-Hood | H04B 7/0894 455/66.1 |
| 2010/0316038 A1* | 12/2010 | Osato | H04B 1/70752 370/342 |
| 2011/0291889 A1* | 12/2011 | Mayo | H01Q 3/34 342/372 |
| 2012/0212371 A1* | 8/2012 | Chang | H01Q 3/46 342/373 |
| 2013/0072244 A1 | 3/2013 | Jeong et al. | |
| 2014/0105054 A1* | 4/2014 | Sægrov | G01S 5/0072 370/252 |
| 2015/0061930 A1* | 3/2015 | Runyon | H01Q 19/17 342/354 |
| 2017/0311307 A1 | 10/2017 | Negus et al. | |
| 2019/0288378 A1* | 9/2019 | DiFonzo | H04W 16/28 |

OTHER PUBLICATIONS

United Kingdom Search Report, GB1807538.2, dated Oct. 15, 2018, 4 pages.

* cited by examiner

BEAM ALIGNMENT FOR ELECTRONICALLY STEERED ANTENNAE SYSTEMS

RELATED APPLICATIONS

This Application is the National Stage of International Application No. PCT/GB2019/051238 filed on May 3, 2019, which claims priority from Application 1807538.2 filed on May 9, 2018 in the United Kingdom. The entire contents of these applications are incorporated herein by reference in their entirety.

The present invention relates to improvements to the beam alignment for an electronically steered antenna system, potentially, though not exclusively including phased array antennae and, in particular, to improved auto-alignment techniques.

TECHNICAL FIELD

Background

An electronically steered antenna system, in particular one including phased array antennae may be able to detect transmissions from a plurality of different entities and problems may arise in discriminating between transmissions from these entities. One approach to resolving these issues is to iterate based on a priori knowledge about the approximate location of the desired transmitter. Using this knowledge about the approximate location, the phased array may be configured to converge on the strongest signal in the relevant sector of the sky and lock onto that signal. However, if the desired signal is not the strongest signal in that sector of the sky, the antenna may focus on the wrong transmitter.

It is against this background that the present invention has arisen.

SUMMARY

According to the present invention there is provided a method of auto-aligning a beam within a receiving electronically steered antenna system comprising a plurality of antenna elements, the method comprising the steps of: providing a list of codes, wherein each code is embedded in signals transmitted by a respective transmitting entity, and identifies the transmitted signal as originating from said transmitting entity; selecting a transmitter and identifying a corresponding code for that transmitter.

The method further comprises, for each antenna element: receiving a first communications signal; receiving a second signal representative of first communications signals received by each of the plurality of antenna elements; correlating the first and second signals with the identified code to generate a first and second output signals; comparing the first and second output signals and determining a phase shift and/or a time delay for minimizing the difference between the first and second output signals; and applying the phase shift and/or time delay to the first received communication signal.

Advantageously, in some embodiments the step of applying the phase shift and/or time delay to the first received communications signal maximises the correlated power of the code corresponding to the selected transmitter and thereby aligns the receiving beam of the antenna system to the selected transmitter.

The term "correlating" as defined herein is meant to refer to any process by which a signal is compared to or combined with another signal to generate an output that is proportional to the similarity between those two signals.

The first communications signals referred to herein are continuous signals defined by channels, with any part of a continuous signal received on a same channel comprising a part of the same first communications signal.

Also provided is a system for carrying out the method of the present invention, the system comprising: at least one transmitting entity, the at least one transmitting entity configured to embed a code from a list of codes into a signal, and to transmit the signal containing the embedded code; and a receiving electronically steered antenna system comprising at least one receiving antenna; wherein the list of codes is the same as the list of codes provided to the receiving electronically steered antenna system, and wherein the embedded code identifies the transmitting entity.

embedding a code in each transmitted signal, wherein the code identifies the transmitting entity; providing a list of codes; selecting a transmitter and identifying a corresponding code for that transmitter; executing an iterative converging algorithm to maximise the correlated power of the code corresponding to the selected transmitter and thereby aligning the receiving beam to the selected transmitter.

The present invention therefore provides for efficient signal acquisition without a priori knowledge of the approximate location of the entity. This is an open loop approach to beam pointing where the initial scan will take in the entire sky.

Because the method includes seeking an embedded code, it allows the system to align its beam to a transmitted signal that is not the strongest signal present. So, the method enables the system to autonomously and automatically acquire a signal from a chosen entity in the presence of several other transmitting entities.

The codes may be orthogonal in order to minimise cross correlation. Therefore each code is selected to be orthogonal to other codes so that the cross correlation of any two codes is minimised. This is intended to prevent an unwanted code from correlating with a desired code and making the desired code effectively invisible due to the correlation between the codes.

The method may be deployed within a GPS system or an Inertial Navigational Signal (INS) system.

The codes may be embedded in the transmitted signal so that they are transmitted within a fixed framing structure. In particular, the fixed framing structure may be synchronised with a GPS tick. A GPS tick is generally provided as a pulse every second and a framing structure can be built around this pulse.

In some embodiments, the codes are embedded in the transmitted signal by superposing the code on the signal. A superimposed code may be transmitted continuously within the wanted data band but at a lower power than the wanted data. For example, the code may be a Phase Shift Key (PSK) sub-carrier.

In some embodiments, the codes are embedded in the transmitted signal by interleaving the code with the signal. An interleaved code may be transmitted within the wanted data stream in some form of time multiplexed way at the same power as the wanted data.

In some embodiments, the codes are provided on a separate channel in the form of a narrow bandwidth beacon at a predetermined frequency. Such a beacon would be provided on each satellite, even though the satellite may be providing a plurality of transmitted signals.

The electronically steerable antenna system may include a plurality of satellites, which may be geostationary satellites or LEO satellites.

The method is particularly appropriate to receiving data from a constellation of LEO satellites as the alignment of the antenna to a different antenna is a frequent requirement as different LEO satellites come into view of a terrestrial electronically steerable antenna.

The method is also particularly appropriate to receiving data in an electronically steerable antenna system which is moving relative to the earth's surface. Such a system may be located on an aircraft or boat or train or other vehicle that is moving across the earth's surface or above the earth's surface and therefore moving relative to the geostationary satellites.

The electronically steerable antenna system may include a plurality of vehicles capable of moving relative to the earth's surface. These vehicles may be selected from a group including aircraft, automobiles, trains and water craft such as yachts.

The electronically steerable antenna system may include a plurality of terrestrial base stations.

The system may be configured to have a plurality of beam widths and gains which can be scanned in order to maximise the correlated power of the signal containing the selected code. The method may therefore include an initial iteration of dividing the visible sky into two halves and determining in which half the desired transmitter is located. A second iteration would then be achieved using a narrower beam width with a higher gain, effectively dividing the half of the sky containing the desired transmitter into two halves, effectively quarters of the visible sky, and determining in which part the desired transmitter is located. Further iterations will follow, each effectively halving the sector of the sky viewed until the beam is focussed on the location of the transmitter, thus enabling efficient receipt of the transmitted beam from the transmitter.

The method may be deployed within a multi-beam system and each beam within the system may be directed to correlate on a different code and therefore beam form to a different transmitting entity. This is particularly appropriate when there is relative movement between the antenna and the transmitters, because switching preferred transmitter will be a required part of functionality of the system. For example, for a terrestrial electronically steerable antenna receiving transmissions from a constellation of LEO satellites, one beam within the multi-beam system may lock onto a first LEO satellite, whilst a second beam seeks the next LEO satellite in the sequence, i.e. the next satellite that will take the optimum position, thus enabling an efficient transition through the constellation of satellites that pass within view of the terrestrial electronically steerable antenna.

This multi beam functionality would also be very useful for an electronically steerable antenna provided on a moving vehicle receiving transmissions from geostationary satellites.

BRIEF DESCRIPTION OF THE DRAWINGS

The invention will now be further and more particularly described, by way of example only, and with reference to the accompanying drawings, in which we consider phased array antennae as examples of electronically steerable antennae.

DETAILED DESCRIPTION

The phased array antenna comprises a plurality of elements, each of which is capable of viewing the entire visible sky. In some embodiments the antenna may have in excess of 1000, in excess of 2500 or even in excess of 5000 elements. The phased array antenna can be configured as a panel that can be used to provide an improved gain and signal-to-noise ratio when sending and receiving electromagnetic communications signals. A phased array antenna system may comprise one or more phased array antenna panels that automatically focus their beam of maximum gain to a transmitter or receiver of electromagnetic communications signals such as a LEO or geostationary satellite.

Focussing the phased array antenna system reduces the bandwidth of the phased array antenna acting as a receiver. The noise that the receiver is subjected to is proportional to the bandwidth of the system. As an example, if the bandwidth is reduced by a factor of 10 the signal-to-noise ratio is improved by 10 dB. The bandwidth of the antenna system can be considered as the range of frequencies where the antenna characteristics, such as beamwidth, input impedance, pattern, polarisation, side lobe level, gain, beam direction, radiation efficiency for example, are within an acceptable value.

The beam is focussed on the selected transmitter with the desired code embedded within the signal by generating feedback signals that are used to set relative phase shifts and/or time delays that are applied to local controllable oscillators associated with each of the elements that are used as part of modulation/demodulation operations which are part of the normal functioning of the elements when the antenna system is used in telecommunications.

The feedback signals can be generated by comparing an output signal of an individual element with a "consensus output signal" that represents the mean of the output signals of a plurality of other elements.

A feedback signal adjusts the relative phase of the local phase shifter and/or the time delay generator associated with the individual element until an output signal of the individual element is the same as, or represents the same value as, an output signal of the plurality of other elements. This is based on a goal function of maximising the correlated power of the signal containing the selected code which will therefore cause the beam to focus on the selected transmitting entity. This step may be performed by an iterative converging algorithm including, but not limited to, least mean square or Genetic. When each individual element provides the same output signal as the other elements, the local phase shifter and/or time delay generator may be considered to be sufficiently phase-aligned with the selected communications signal.

The presence of noise associated with the signal necessitates the use of an iterative converging algorithm, as a single calculation would be disrupted by the noise associated with the signal.

Use of the consensus output signal can enable a more accurate feedback signal to be generated as the overall noise associated with the consensus signal is less than the noise of the individual signals received at the individual elements.

The system may have multiple beams and the method may therefore operate such that the first beam is aligned to a first selected transmitting entity and the second beam is configured to search for and co-ordinate with reference to the first beam, a full inventory of alternative transmitters for which the identity code is known. The method may include not only focussing on a single selected code, by focussing on a known sequence of codes in a specific order. If the second beam is tracking all of the known transmitters, then the code sequence can dictate the identity of the next selected code to which the antenna should beam form.

Figure 1:
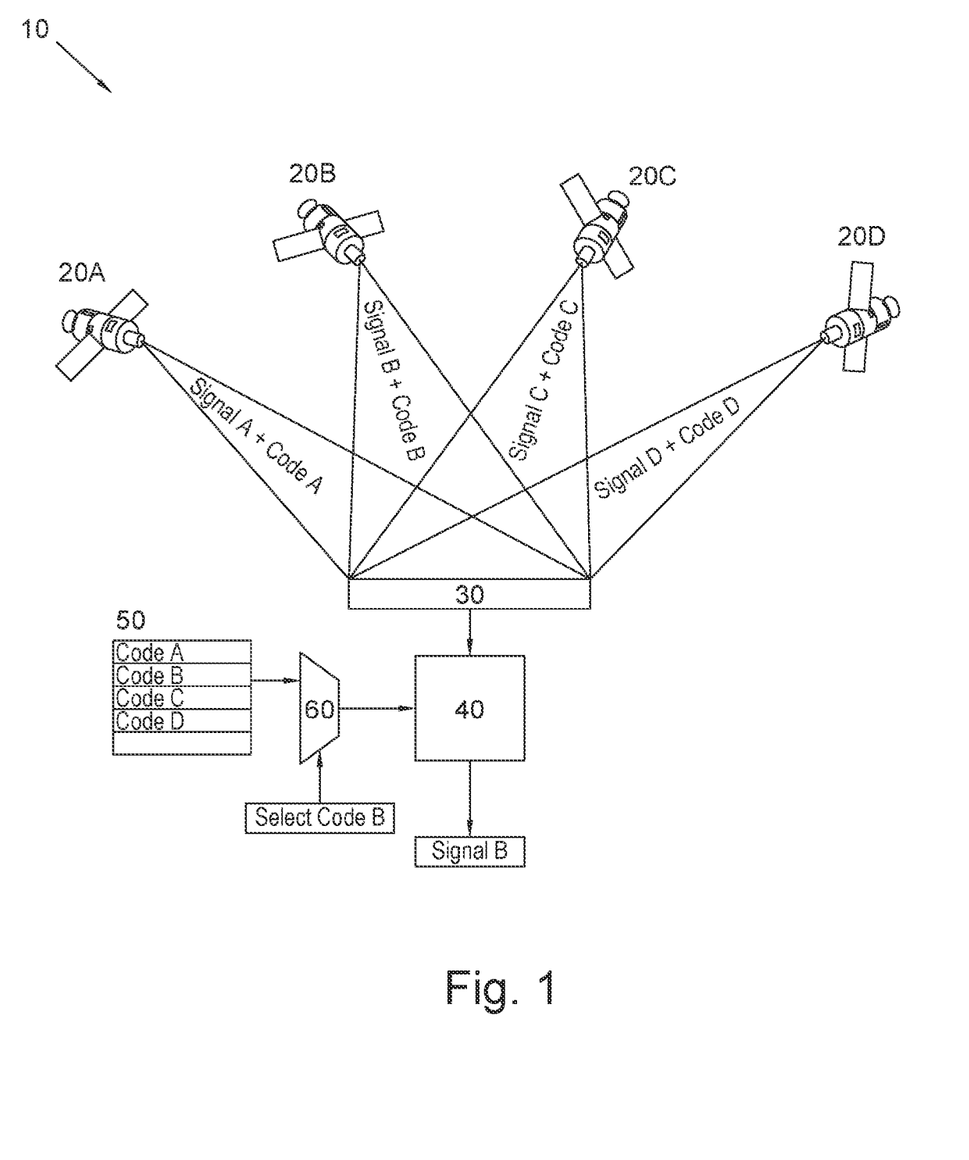
FIG. 1 shows a phased array antenna system configured to perform the method of the present invention.

An example of a phased array antenna system 10 configured to carry out the method is shown in FIG. 1. The system comprises a plurality of transmitters 20 each transmitting a signal. The phased array 30 receives signals from all of the transmitters 20. The received signals are all fed into a correlator 40. The system 10 also comprises a listing 50 of codes corresponding to the different transmitters 20. The user indicates the desired signal via a multiplexer 60. This selection is fed forward to the correlator 40 which identifies the signal corresponding to the desired code and feeds out the signal associated with that code.

In the illustrated example, there are four transmitters 20: A, B, C and D. Each transmitter 20 transmits a signal including an identification code. Transmitter A transmits signal A and code A; transmitter B transmits signal B and code b; transmitter C transmits signal C and code C and transmitter D transmits signal D and code D. The user selects code B via the "mux" 60 and the details of code B are drawn from the listing 50. The details of code B are fed forward to the correlator 40 which extracts from the overall signal received, the signal associated with code B, i.e. signal B. This signal B is then output from the system.

In order to optimise the strength of the desired signal received, the array 30 is steered towards the selected signal. An algorithm is executed within the correlator to maximise the correlated power of the signal containing the code corresponding to the selected transmitter and thereby aligning the beam to the selected transmitter. The algorithm may be an iteratively converging algorithm so that the beam can be steered without any a priori knowledge of the position of the desired transmitter within the visible sky.

This configuration is appropriate as an add-on to an existing electronically steered antenna system. It requires the system to possess a priori knowledge about how to beam form. By providing this configuration to an existing electronically steered antenna, there would be no need for system calibration. However, there are more elegant solutions, as discussed below which reduce complexity.

Figure 2:
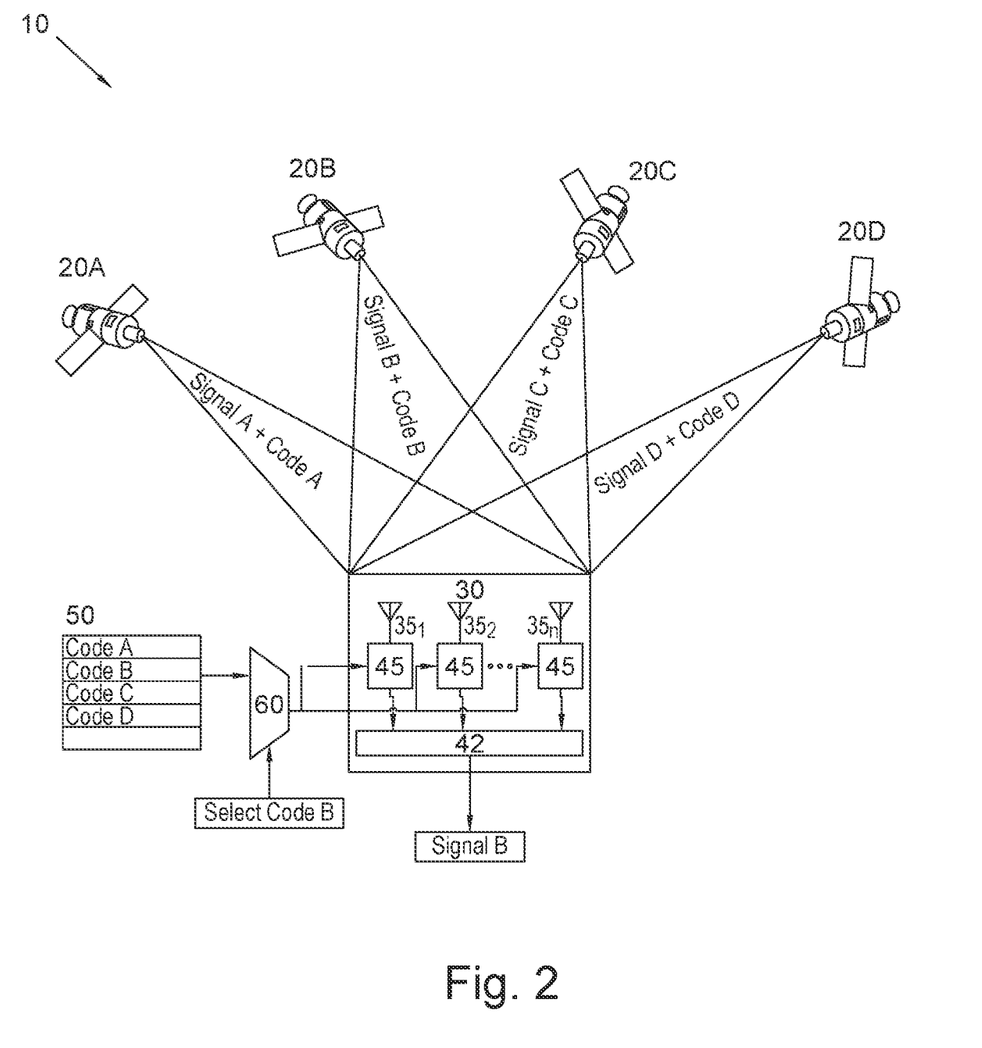
FIG. 2 shows a further phased array antenna system configured to perform the method of the present invention.

FIG. 2 shows a further example of a phased array antenna system 10 configured to carry out the method. The system 10 comprises substantially the same constituent parts as the system shown in FIG. 1 and like reference numerals therefore apply to both diagrams. The two systems, shown in FIGS. 1 and 2 respectively, operate similar methods. The key difference between the methods operated being that, in FIG. 2, a correlator 45 is provided to each element 35 within the phased array 30. The selection of the desired signal and the steering is therefore achieved on an element by element 35 basis, with these elements being combined in a beam forming network 42.

Although the configuration of FIG. 1 is more cost effective and easier to implement due to the reduction in complexity realised by the reduction in the number of correlators, the configuration of FIG. 2 solves a number of problems in the beamforming process.

In order to better explain the advantages of the embodiment of FIG. 2, an example configuration of a phased antenna with a correlator 45 for each element 35 will first be described in relation to FIG. 3. This phased array antenna system is similar to that described in more detail in WO 2010/007442 which is incorporated in its entirety herein.

Figure 3:
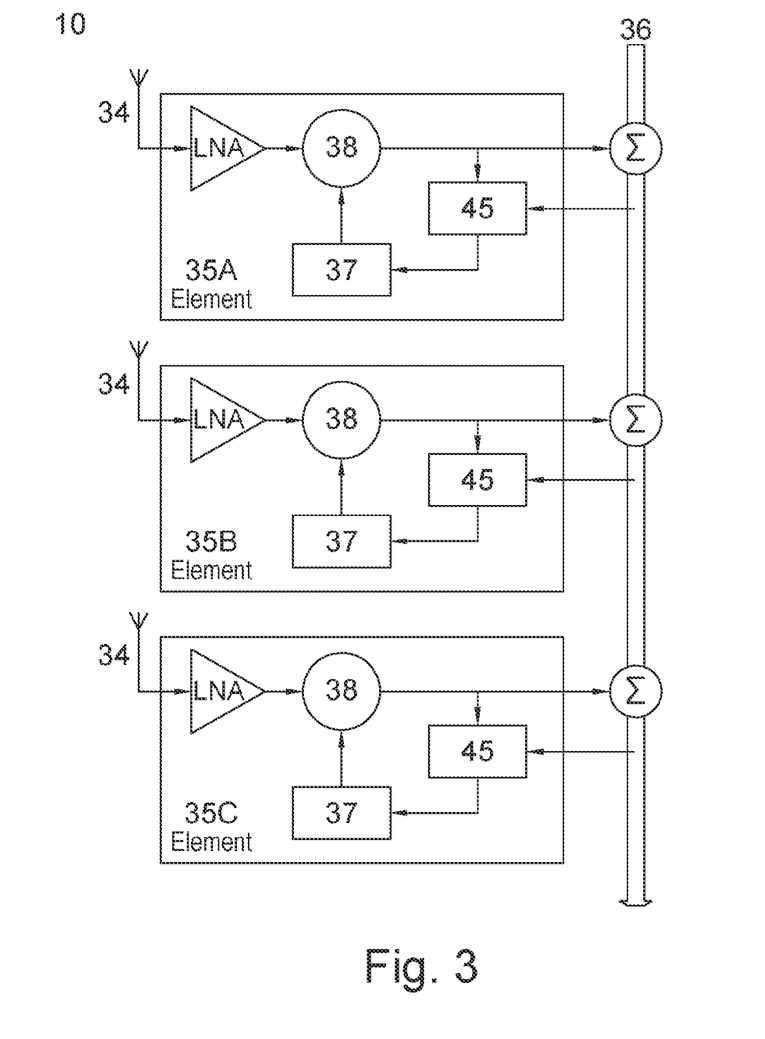
FIG. 3 shows an example phased array antenna system.

FIG. 3 shows an example configuration of a phased array antenna system 10 comprising a plurality of elements 35 configured to receive a communications signal 34, and each of which are configured with a correlator 45 and coupled to a bus 36 which carries a global combined signal representative of the composite of the output of all of the elements 35.

The signal representative of the composite value from bus 36 is provided as an input signal to each element 35. Each element 35 then uses its correlator 45 to internally generate its own error signal 37 using the composite signal from bus 36 and its respective elemental output signal. Error signal 37 could be a phase error signal or a time error signal, or a composite signal comprising a phase error and a time error. This error signal 37 is then used by local phase shifter and/or time delay generator 38 to generate a phase shifted and/or time delayed output signal for the element 35.

The signal on the bus 36 may be considered as a "consensus signal" as it provides an indication of the signals output by the plurality of elements 35 and is used in order to bring the output of individual elements into concordance/harmony with the other elements in the phased array antenna.

In this example, the error signals that are provided to respective local phase shifters and/or time delay generators associated with each element 35 are generated as a consequence of processing performed by the element 35 to compare the value of the output signal on the bus 36 with the elemental output signals, and generating an analogue feedback signal representative of that comparison.

The signals on the bus 36 comprise a superposition of current signals output by all the elements 35. The superposition of the current signals output by the elements 35 may provide an indication of the average value of the output baseband signal.

As an example, if one hundred elements are coupled to bus 36, and eighty of those elements provide a baseband output signal with a positive current and the remaining twenty elements provide a baseband output signal with a negative current, the superposition of the one hundred baseband current signals on the output bus will provide a composite signal representative of a positive current. This composite signal can be used by each of the elements as an indicator of what the baseband output of that element should be. The signal on the output bus may be considered as an indication of the most common output signal at that time for the phased array antenna as a whole.

When applying the analogue feedback signal to set the relative phase and/or time delay that should be applied to Element 35A, Element 35A is considered as a first antenna element, and each of the elements Element 35B to Element 35C are considered as second antenna elements. Signals received at the second antenna elements are used when determining the phase shift and/or time delay that is applied to the first antenna element.

Similarly, when applying the analogue feedback to Element 35B, it is Element 35B that is considered as the first antenna element and all of the other elements are considered as the second antenna elements, and so on. It will be appreciated that each of the antenna elements 35 can be considered as a first antenna element when determining the phase shift and/or time delay that should be applied to that antenna element 35 as a function of signals received at each of the other, second, antenna elements.

Once each element is aligned it may maintain the required relationship between the local phase shifter and/or time delay generator 38 and the received communications signal 34 that is necessary to align its local constellation with the consensus constellation the buses 36. The phased array antenna is assumed to be small in relation to the velocity of light/data symbol period.

When this process is repeated over time and amongst all elements 35 in a phased array system, the result is for the system to converge and maximise the beam forming in the direction of the incoming signal.

However, as mentioned above, there are a number of problems with this approach.

A first problem is the need to have "a priori" knowledge of the starting state of the system in order to set the local phase shifter and/or time delay generator 38 of each antenna element 35 to be in agreement with each other, such that the beam is initially formed in a known direction.

That is, if in the approach described in relation to FIG. 3 the system is initialized in a random, undefined state, then the resulting global consensus signal carried by bus 36 will be a random summation of each element's signal and not a constructively summing result. This is means that the correlator process in each element will struggle to calculate the error signal of each element in a reasonable time period.

The second problem is that, even once the local phase shifters and/or time delay generators 38 of the antenna are in agreement, there is a need to have knowledge of where a transmitting entity, for example, a transmitting satellite, is with respect to the phased array antenna 10 in order to align the beam in that direction and use the antenna gain to amplify the desired signal over all the other undesired signals in the sky.

If the array is beam formed already, and the desired signal is within the main beam, then the antenna gain will enable this signal to be significantly higher than the other signals on the global consensus signal. The elemental local phase shifters and/or time delay generators 38 will then therefore produce an error with respect to this signal rather than any others.

However, if the desired signal is not within or near the main beam, the antenna gain will not amplify the desired signal, hence all signals incident on the array could be at a similar level. In such a situation, the algorithm will start to converge on the strongest signal at that point, and not necessarily the desired signal.

In order to guarantee that the algorithm converges on the correct signal, and hence beam-forms in the correct direction, there is a need to amplify the desired signal or attenuate all the other signals, such that the correlator 45 in each element can produce a more accurate error signal 37. This can be achieved by adding a code mask filter 41 to each of the elements.

Figure 4:
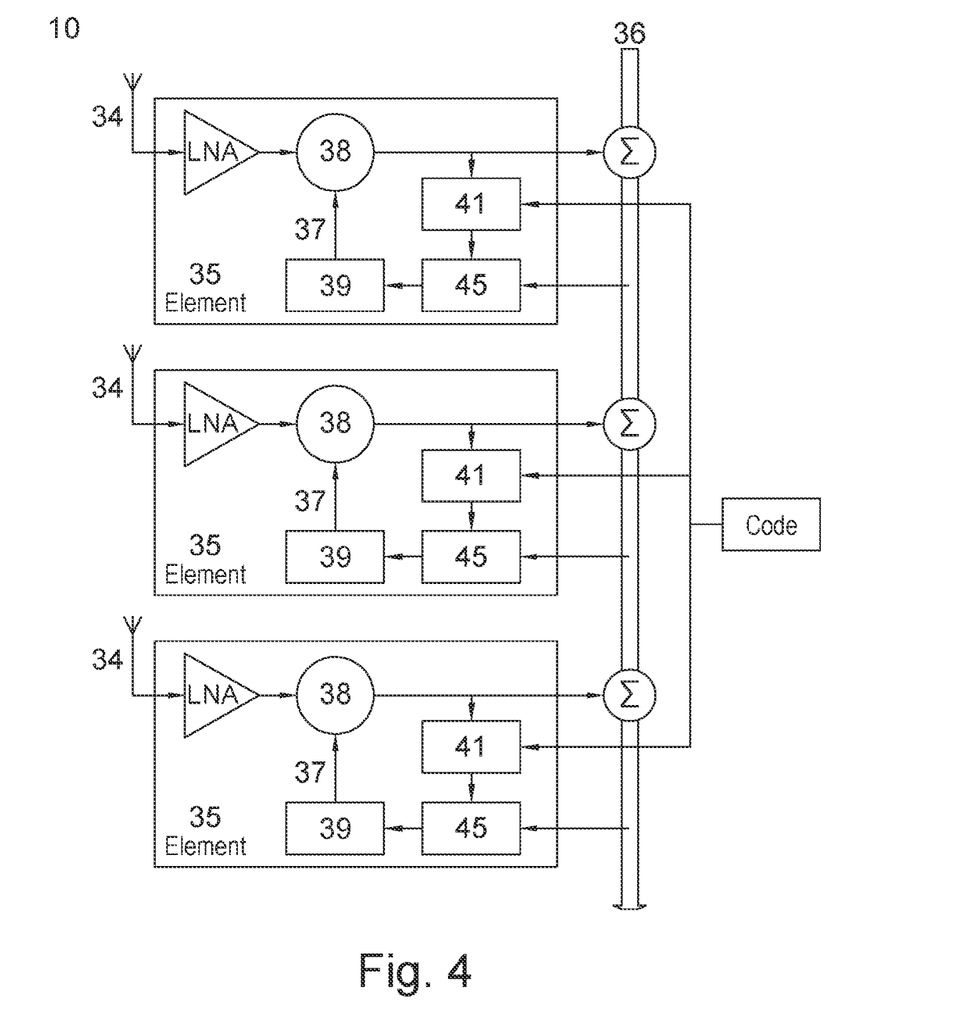
FIG. 4 shows a further phased array antenna system configured to perform the method of the present invention.
Figure 5:
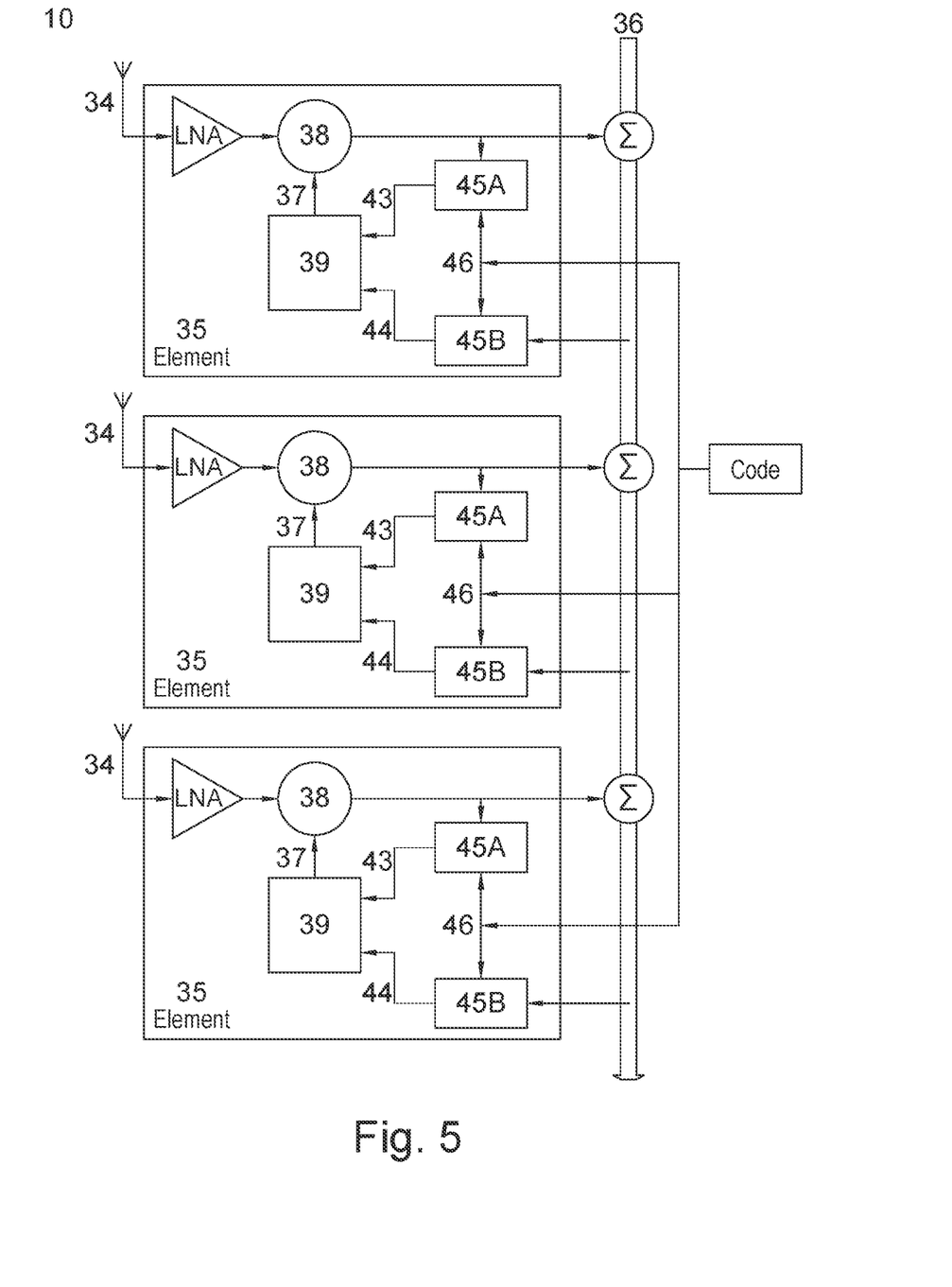
FIG. 5 shows a more detailed example configuration of the phased array antenna system of FIG. 4.

FIGS. 4 and 5 illustrate example phased array antenna systems 10 according to the present invention where a correlator 45 is applied to the received signals being processed in each of the antenna elements 35.

In particular, FIG. 4 illustrates a system for carrying out the method of the present invention, and FIG. 5 illustrates a specific example configuration of the system shown in FIG. 4.

The code mask filter 41 filters the processed signals 34 to isolate signals containing the codes embedded by selected transmitting entities as described above, and thus enables the desired satellite signal to be filtered out with respect to the other unwanted signals received at the array.

In this configuration, the global consensus signal carried by bus 36 becomes a harmonised consensus signal, with all the antenna elements 35 outputting their perceived value for the filtered signals, as opposed to outputting perceived values for whichever signals happen to be incident on that element.

In the example of FIG. 5, the code input 46 specifying the desired satellite is loaded into each element 35. There is then a first correlator 45A that takes the locally received signal at each element 35 and correlates this with the code input 46 to produce an angle, alpha 43. There is also a second correlator 45B that takes the harmonised global consensus signal carried by bus 36 and correlates this with the code input 46 to produce an angle, beta 44. By comparing alpha 43 and beta 44, the error processor 39 can generate an error signal 37 to minimise the difference between alpha 43 and beta 44 at each element 35.

Other correlation algorithms making use of the filtered locally received signal and the harmonized global consensus signal may also be used.

Figure 6:
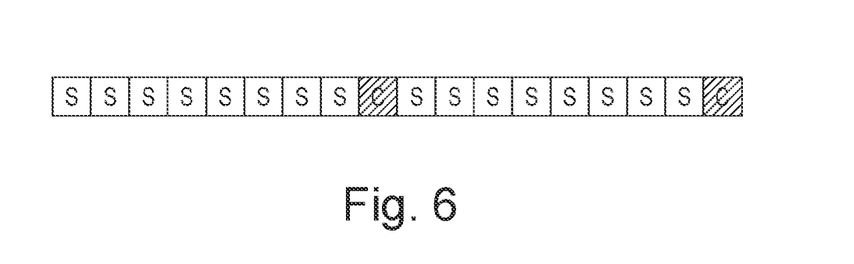
FIG. 6 shows a signal frame structure with a code embedded within it.
Figure 7:
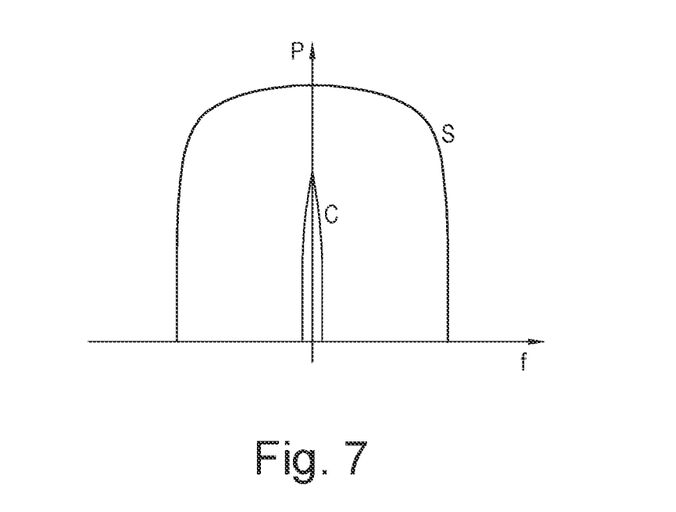
FIG. 7 shows a signal with a code embedded as a sub-carrier.

FIGS. 6 and 7 show, schematically, two different ways in which the code can be embedded within the signal. In FIG. 4, the signal frame structure is illustrated diagrammatically to comprise a plurality of symbols S. Interposed between these signal symbols is a code symbol C. The code symbol C appears at a predetermined rate between signal symbols. The rate would be pre-determined and set out in the protocol. The code symbol C has a frequency profile and length in time that corresponds to a signal symbol S so that it replaces one signal symbol.

In FIG. 7, the power, P (y-axis) and frequency, f (x-axis) profile of the signal S is illustrated. The Code C is embedded within the envelope of the signal S at a lower power and more limited frequency band. This Code C is transmitted constantly beneath the signal S.

It will further be appreciated by those skilled in the art that although the invention has been described by way of example with reference to several embodiments it is not limited to the disclosed embodiments and that alternative embodiments could be constructed without departing from the scope of the invention as defined in the appended claims.

The invention claimed is:

1. A method of auto-aligning a beam within a receiving electronically steered antenna system comprising a plurality of antenna elements, the method comprising:
   providing a list of codes, wherein each code is embedded in signals transmitted by a transmitter of a plurality of transmitters, and identifies the transmitted signal as originating from the transmitter;
   selecting a transmitter from among the plurality of transmitters and identifying a code corresponding to the selected transmitter; and
   for each antenna element:
   receiving a first communications signal;
   receiving a second signal representative of the first communications signal received by the plurality of antenna elements;
   correlating the first communications signal and the second signal with the identified code to respectively generate a first output signal and a second output signal;

comparing the first output signal and the second output signal, and determining an error signal that includes one or both of a phase error signal and a time error signal; and minimizing a difference between the first output signal and the second output signal by applying the error signal to the first communications signal.

2. The method according to claim 1, wherein comparing the first and second output signals and determining the error signal is performed by executing an algorithm, and the algorithm is an iteratively converging algorithm.

3. The method according to claim 1, wherein the codes are orthogonal in order to minimise cross correlation.

4. The method according to claim 1, wherein the codes are embedded in the signals transmitted by a respective transmitting entity so that they are transmitted within a fixed framing structure.

5. The method according to claim 4, wherein the fixed framing structure is synchronised with a GPS tick.

6. The method according to claim 4, wherein the codes are embedded in the signals transmitted by the transmitter by superposing the code on the signals.

7. The method according to claim 4, wherein the codes are embedded in the signals transmitted by the respective transmitting entity by interleaving the codes with the signal.

8. The method according to claim 1, wherein the electronically steered antennae system includes a phased array antenna system.

9. The method according to claim 8, wherein the phased array antenna system includes a plurality of satellites.

10. The method according to claim 9, wherein the satellites are selected from a group including geostationary satellites and LEO satellites.

11. The method according to claim 8, wherein the phased array antenna system includes a plurality of vehicles capable of moving.

12. The method according to claim 11, wherein the vehicles are selected from a group including aircraft, automobiles, trains, and water craft.

13. The method according to claim 8, wherein the phased array antenna system includes a plurality of terrestrial base stations.

14. The method according to claim 8, wherein the phased array antenna system comprises a plurality of antenna elements and wherein the method further comprises executing an algorithm to maximise a correlated power of the code corresponding to the selected transmitter and aligns the beam to the selected transmitter within each element of the phased array antenna.

15. The method according to claim 1, wherein the system is configured to have a plurality of beam widths and gains which can be scanned in order to maximize a correlated power of the selected transmitter.

16. The method of claim 1, wherein applying the error signal to the first communications signal maximizes a correlated power of the code corresponding to the selected transmitter and thereby aligns the receiving beam of the antenna system to the selected transmitter.

17. A system comprising:

at least one transmitting entity, the at least one transmitting entity configured to embed an embedded code from a list of embedded codes into a signal, and to transmit the signal containing the embedded code; and a receiving electronically steered antenna system comprising at least one receiving antenna and configured to carry out the method according to claim 1, wherein the list of embedded codes is identical to the list of codes provided to the receiving electronically steered antenna system, and wherein the embedded code identifies the transmitting entity.

* * * * *